UNITED STATES PATENT OFFICE.

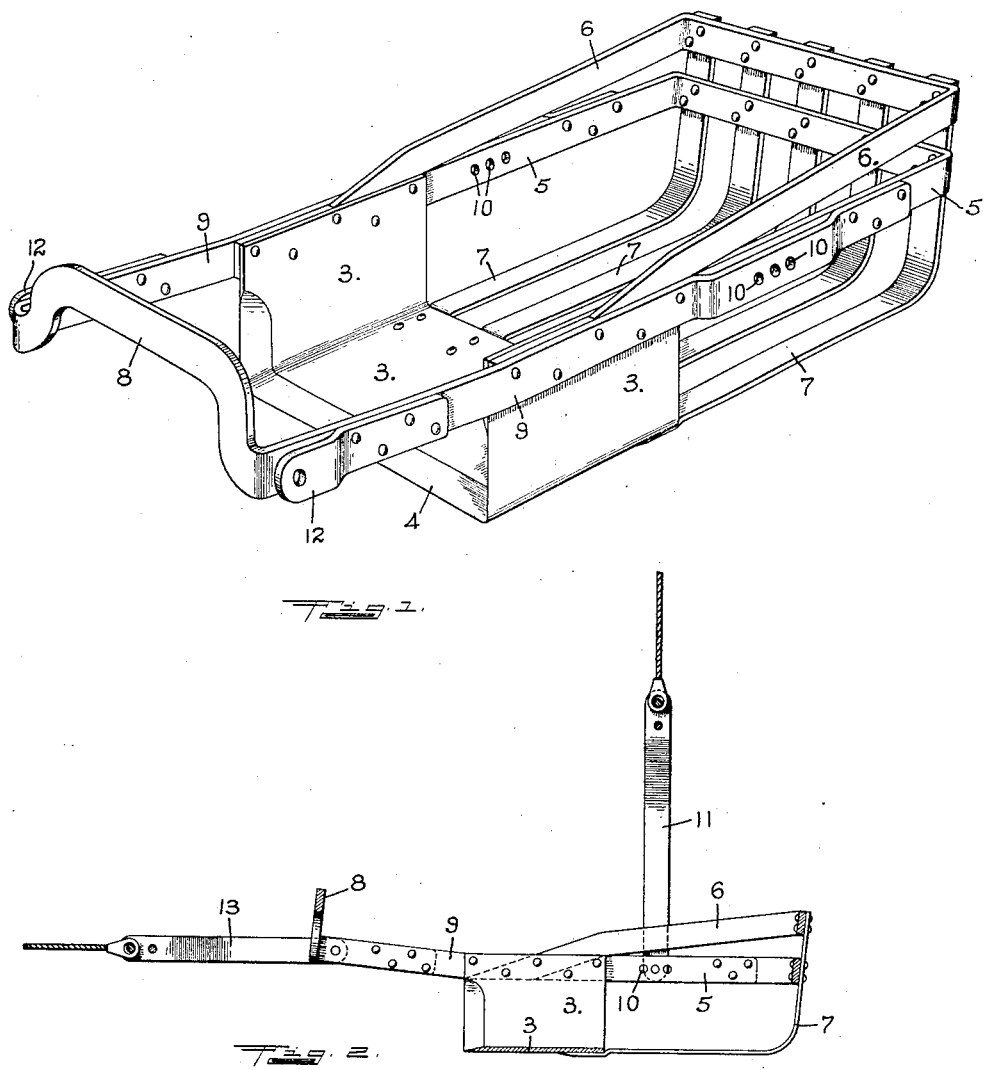

FRANK M. TURNER, OF OMAHA, NEBRASKA, ASSIGNOR OF ONE-HALF TO E. F. QUACKENBUSH, OF ONAWA, IOWA.

EXCAVATING-SCOOP.

1,330,826.     Specification of Letters Patent.     Patented Feb. 17, 1920.

Application filed July 24, 1919. Serial No. 313,066.

*To all whom it may concern:*

Be it known that I, FRANK M. TURNER, a citizen of the United States, and a resident of Omaha, in the county of Douglas and State of Nebraska, have invented certain new and useful Improvements in Excavating-Scoops, of which the following is a specification.

My invention relates to excavating and dredging machinery, and it is the object thereof to provide a dipper, scoop, bucket or scraper particularly adapted for use in sticky and adhesive materials, such as wet soils, clay, gumbo and the like, where with the ordinary forms of scoop or dipper a large proportion of the load will adhere to the sides and bottom of the receptacle and cannot be discharged therefrom without great difficulty. My scoop or dipper comprises essentially an open, latticed or slatted body which presents a comparatively small surface for the adhesion of sticky material thereto, said body being provided with a continuous cutting edge or bit, whereby to cut off cleanly the material which is loaded into the receptacle during the filling thereof. The use of the continuous cutting edge or bit distinguishes my scoop from the open or slatted scoops of the fork type, adapted for use in fibrous, matted and stringy material, wherein the portion of the device which first enters the material comprises spaced bars, prongs or fork-like projecting parts.

In the accompanying drawings Figure 1 is a perspective view of a scoop embodying my invention, and Fig. 2 is a longitudinal vertical section of the same, showing hoisting and draft bails thereon.

The scoop in the structure illustrated is adapted for use with excavating machines of the "drag-line" type, wherein the operation of the scoop or dipper is effected by means of a hoist-line or cable which passes over a supporting boom and then extends down to the scoop, and a drag-line or cable by which the scoop is pulled during the filling thereof. It will be apparent, however, that the essential features of the scoop may be embodied in forms adapted for use with other types of excavating or earth-moving apparatus. In the structure shown in the drawing, the front portion of the scoop-body is formed by a U-shaped blade 3 having a sharpened cutting edge 4, said blade forming the "bit" or portion of the device which cuts through the material in filling the scoop. To the side-portions of the bit 3 at the upper ends thereof are secured the forward ends of a U-shaped frame-bar 5 which extends back horizontally in the plane of said attached ends thereof. A second bar 6, of similar form, is attached to the bit, as shown, and extends diagonally upward from the plane of the bar 5, so that the transverse rear portion of said bar 6 is spaced from the first bar by an amount equal to the width of the bars. A plurality of L-shaped bars 7 have rear upwardly extending portions which are secured to the transverse rear portions of the bars 5 and 6, and the front ends of said bars 7 are secured to the bottom portion of the bit, said ends of the bars being downwardly offset the thickness of the bit, so that their upper edges behind the bit are level with the upper surface thereof. To the described body of the scoop there is secured a draft-bar comprising a front transverse upwardly bowed portion 8 and rearwardly extending side-portions 9 which overlap the side portions of the bar 5 and are fixedly secured thereto, as well as to the bar 6 and bit 3, by means of bolts or rivets which extend through the overlapped parts, as shown. Near the rear ends of the side-portions of the draft-bar, at about the center of the scoop-body, said bar-portions are bowed outwardly from the bar 5, and a plurality of transversely alined holes 10 are provided in said laterally spaced portions of the members 5 and 9. The ends of the hoist-bail 11 are inserted in the space between said members, and are pivotally connected therewith by means of bolts extended through any set of the holes 10. In front of the bit the side-portions of the draft-bar are inclined slightly upward, as best indicated in Fig. 2, and to said side-portions are secured the ear-pieces 12. The front ends of the latter are offset outwardly to provide between them and the bar-portions 9 a space for receiving the ends of the draft-bail 13, which is pivotally connected therewith by means of bolts extending transversely through the parts.

The described scoop or dipper is used in the same manner as the ordinary solid scoops usually employed for earth-moving purposes. Extensive tests of the scoop, in sticky and adhesive soils, clays, and gumbos, have shown that the material will discharge or dump freely from the scoop, thus allowing a full load to be handled at each operation. Ordinary scoops or dippers in the same material were found to retain from one-half to two-thirds of their load, by reason of the material adhering to the sides of the receptacle, so that the effective work performed with such scoops was very much less than with the slatted scoop provided by my invention. My scoop may be handled with less power than a solid scoop of the same nominal capacity, both on account of there being no return-load therein, and also because the filling of the scoop may be effected with less resistance on account of the reduced friction occasioned by the use of the longitudinally slatted bottom of the scoop.

Now, having described my invention, what I claim and desire to secure by Letters Patent is:

1. In a scoop for cutting and moving adhesive soils, a slatted body having the front portion thereof formed by a transversely extending bit provided with a continuous cutting edge.

2. In a scoop of the class described, a U-shaped bit having a sharp edge, a U-shaped frame-band having the ends thereof secured to the end-portions of the bit, and a plurality of L-shaped bars transversely spaced and having their opposite ends secured to the intermediate portions of the bit and frame-band.

3. An excavating device comprising a scoop-body having a transverse continuous bit forming the front portion thereof, longitudinally extending transversely spaced bars secured to and extending rearwardly from said bit, transverse connecting means between the rear portions of said bars, and means for connecting hoisting and draft bails to said scoop-body.

FRANK M. TURNER.